United States Patent Office 3,058,850
Patented Oct. 16, 1962

3,058,850
METHOD FOR HYDROPHOBIZING WOOL CONTAINING FABRIC
Francis M. Sell, Spartanburg, S.C., assignor to Deering Milliken Research Corporation, Pendleton, S.C., a corporation of Delaware
No Drawing. Filed Nov. 4, 1958, Ser. No. 771,729
9 Claims. (Cl. 117—141)

This invention relates to methods for rendering textile fabrics water repellent, and more particularly the invention relates to methods wherein a polymerizable silicone material and a zirconium salt of an organic acid are applied to a fabric.

It has been previously suggested that a coating of organic acid salts of zirconium be applied to a textile material to make the same water repellent, but water repellency imparted to textile materials by such a procedure does not have a high degree of permanency and the process requires a relatively heavy coating of the organic acid salts to impart satisfactory initial water repellency. It has also been suggested that textile materials be treated with a polymerizable silicone material emulsified in a solution of a water soluble inorganic zirconium salt, the emulsion being formed with a quaternary ammonium halide emulsifying agent, but such a process requires a high temperature curing operation to destroy the emulsifying agent and requires the use of relatively large amounts of the silicone resin material to give a satisfactory degree of water repellency.

A simplified flow diagram of the process of this invention is as follows:

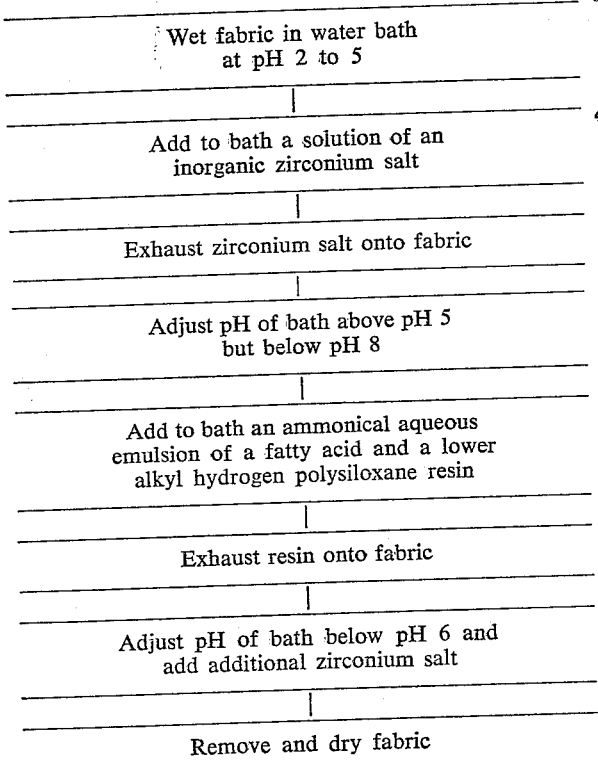

According to the present invention improved results are obtained, as compared to either of the above mentioned prior art procedures, by first applying to a textile material an inorganic zirconium compound and thereafter treating the textile material with an ammonical aqueous emulsion of a polymerizable silicone material and an organic acid. In the basic ammonical solution the organic acid serves as an emulsifying agent but once the oil phase of the emulsion is deposited upon the fabric, the organic acid reacts with the zirconium to form a water insoluble salt which not only serves as a catalyst for the polymerization of the silicone resin but also serves to directly increase the water repellency of the processed fabric.

A primary advantage of a process according to this invention is that no heating operation is required. High temperatures damage woolen fabrics and it can readily be shown that heating a woolen fabric to any temperature above 100° C. results in permanent and irreparable damage. In addition, a high temperature curing operation sometimes effects shade changes in the dyes with which woolen materials are conventionally dyed and when this occurs it makes matching of samples a near impossible task.

Another important advantage of a process according to this invention is that excellent water repellency with a high degree of permanency can be obtained with the use of a minimum amount of silicone resin. A first reason that a relatively small amount of the silicone resin material can be employed is believed to be that the zirconium fatty acid salt limits the silicone resin to the surfaces of the fibers rather than permitting it to penetrate into the fibers of the fabric. Other reasons are believed to be that the fatty acid zirconium salt causes the silicone resin to spread upon the surfaces of the fibers rather than remaining in discrete globules so that a relatively uniform coating of the fibers is achieved; the solubility of the fatty acid in the silicone resin results in intimate contact of the zirconium with the silicone resin so that a super-catalytic effect is achieved; not even a trace of the emulsifying agent remains to act as a surface-active or rewetting agent; and the catalyst directly contributes to the water repellency imparted by the silicone material.

Another advantage of a process according to this invention is that it employs a zirconium catalyst and it has been found that zirconium is a particularly desirable catalyst for the reason that it is one of a very few if not the only catalyst for silicone resins that does not result in a shade change when applied to a woolen fabric dyed with acid leveling colors.

Still another advantage of a process according to this invention is its simplicity and convenience. No padding equipment or the like is required and the process can conveniently be conducted with apparatus normally owned by any textile finishing plant. Further, the procedure is a one bath operation and does not require handling the fabric a plurality of times in a number of different solutions.

To describe the invention in greater detail, the fabric to be treated is immersed or partially immersed in a water bath employing equipment which readily permits the fabric to be rapidly moved within or through the bath. The ratio of the weight of the water in the bath to the weight of fabric may be varied within reasonably wide limits but in most instances should not be appreciably below 20 to 1 since with smaller amounts of water it is frequently difficult to achieve an even application of the reagents. The preferred range is from 20 to 50 parts by weight of water for each unit weight of fabric. There is no operative upper limit as to the amount of water which can be employed but with most types of equipment it is generally inconvenient to use a water to fabric ratio of more than 100 to 1.

Fabrics of substantially any composition can be processed according to this invention but the invention finds its primary utility with fabrics composed partly or entirely of wool fibers. In the case of wool blends, the nonwool component or components can be of substantially any known textile fiber material and illustrative examples of fibers that may be present in addition to wool include cotton fibers, viscose rayon fibers, acetate rayon fibers, polyacrylonitrile fibers, nylon fibers, and polyethylene terephthalate fibers. Likewise, fabrics of any weight, style, or construction can be processed.

Almost any water soluble compound of zirconium can be employed in a process according to this invention and the only requirement is that the zirconium compound, in the form that it is deposited on the fabric, be capable of furnishing zirconium ions to react with the organic acid which is employed as an emulsifying agent. Examples of suitable zirconium compounds are the inorganic acid salts of zirconium such as zirconium chloride, and zirconium sulfate. Basic zirconium salts can also be suitably employed and, in fact, zirconium oxychloride is a preferred compound for use in this invention. Nitrate ions frequently appear to interfere with the imparting of a high degree of water repellency by silicone compounds and only for this reason, zirconium nitrate is not among the preferred zirconium compounds for use in this invention.

The amount of zirconium compound applied to the fabric may be varied within reasonably wide limits but as a general rule no less than about 0.1%, based on fabric weight, of zirconium oxychloride ($ZrOCl_2 \cdot 8H_2O$), or an equivalent amount of other zirconium compound or mixture of zirconium compounds, should be applied since if less than this amount is employed, a satisfactory degree of water repellency may not be obtained. The preferred amount of zirconium compound to be applied is from 0.2% to 0.5%, based on fabric weight and calculated as zirconium oxychloride. There is no operative upper limit as to the amount of zirconium compound that can be employed but the use of amounts greatly in excess of 0.5%, based upon fabric weight, frequently results in a harsh fabric which frequently displays "mark off" and makes it more difficult to control the rate of exhaustion of the silicone material onto the fabric, and it is seldom if ever advantageous to employ more than about 0.8% of any selected zirconium compound.

Before being added to the bath, the zirconium compound is preferably dissolved in any desired amount of water although the resulting solution should not be so concentrated that there is danger of precipitation if the solution becomes chilled nor so dilute that it necessitates handling of an objectionably large quantity of solution. If the zirconium compound is added to the bath other than as a solution, it frequently results in an uneven application and even when a solution of the zirconium compound is employed it is usually advantageous to add the same to the bath slowly, for example over a minimum period of from 10 to 15 minutes, to eliminate the possibility of localized areas of high concentration in the bath.

It has been found that water soluble zirconium compounds exhaust from an aqueous bath onto substantially all textile fibers and advantage can be taken of this unusual property in a new process according to this invention. The time required for exhaustion is relatively short and usually most of the zirconium in an aqueous bath will exhaust onto a fabric in only 10 to 30 minutes. The pH of the bath to which the zirconium compound is added has little effect on the exhaustion of the zirconium onto the fabric although it has been found that the rate of exhaustion is slightly more rapid at pH's below 5 and that exhaustion is more nearly complete at pH's above 5. This means that the bath to which the zirconium compound is added can satisfactorily be at almost any pH although it is usually desirable to have the bath at a pH below pH 7 to eliminate any possibility of the zirconium being partially precipitated as the hydroxide, and for reasons of convenience the bath is preferably at a pH of from about 2 to 5 at the time the zirconium compound is added.

After the zirconium solution has been added and most of the zirconium has been transferred from the bath to the fabric, the pH of the bath should be increased to at least about pH 5 to pH 8 if it is not already within this range, but normally should not be increased to a value of above pH 8 because a highly basic bath normally results in bleeding of acid leveling wool dyes. When the pH of the bath is raised to 5 or above, any zirconium remaining in the bath is completely exhausted onto the fabric and in only a few minutes the bath will be found to be free of even a trace of zirconium. This pH adjustment is advantageous not only because it results in complete utilization of the zirconium compound, but also because, in substantially freeing the bath of zirconium, it permits one to employ the same bath for application of the silicone material. The pH adjustment can be made with any of the usual basic materials conventionally employed for pH control but best results are usually obtained by employing a basic salt, such as sodium acetate, which has a slight buffering action. Illustrative examples of other materials which can be employed include sodium carbonate solution and dilute ammonium hydroxide.

The silicone material employed according to this invention is applied to the fabric in the form of an ammonical aqueous emulsion formed with an ammonium salt of an organic acid as an emulsifying agent. Any organic acid which will react with ammonia to form an emulsifying agent can be utilized in the formation of the silicone emulsion, but the preferred class of acids comprises saturated or unsaturated acids having from about 12 to 18 carbon atoms as illustrated by lauric, palmitic, stearic, oleic and linoleic acids. These acids not only give excellent results but unlike certain other acids which are otherwise suitable, do not have an objectionable odor or impart an objectionable color to the fabric being treated. The preferred acid for use in forming the silicone emulsion comprises a mixture of myristic and palmitic acids.

The amount of the fatty acid material that can be advantageously utilized is dependent upon the amount of silicone material employed, and any amount of the acid can be employed which will result in the formation of an emulsion with a satisfactory degree of stability. Generally this means that at least about 2.5% of the organic acid, based on the weight of the silicone material, should be used. There is no fixed upper limit as to the amount of fatty acid which can be used but a practical limit is about 100% by weight of the silicone material. The optimum and preferred amount of fatty acid is from about 10% to 30% by weight of the silicone material.

Any silicone resin having active hydride radicals can be employed in the processes of this invention. Such resins generally contain a plurality of groups of the formula —RHSiO— where R is a hydrocarbon radical, preferably containing not more than 6 carbon atoms, and as a result of active hydride radicals, the resins are capable of further polymerization. Such resins are well known in the art and are described, for instance, in U.S. Patent Number 2,698,334. The preferred resins for use in this invention are the lower alkyl hydrogen polysiloxanes and in particular methyl hydrogen polysiloxanes such as represented by the formula:

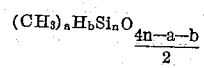

$$(CH_3)_a H_b Si_n O_{\frac{4n-a-b}{2}}$$

wherein $a$, $b$, and $n$ represent positive integers, $a/n$ is equal to from about 1.0 to 1.9, $b/n$ is equal to from about 0.2 to 1.25, and $(a+b)/n$ is equal to from about 2.0 to 3.0 and preferably from about 2.0 to 2.25. From the latter figure it will be seen that $n$ should preferably be equal to at least about 8. Methyl hydrogen polysiloxanes of the above formula are commercially available and are sold under a number of trade names as illustrated by Dow Corning silicone resin DC1107, Dow Corning silicone resin DC104, Carbide and Carbon silicone resin Y1002, and Carbide and Carbon silicone resin Y1003.

It is indeed surprising that part of the polymerizable silicone resin, for example up to about 50%, can, in many instances, be replaced with a non-polymerizable siloxane polymer with excellent results and without the non-polymerizable material being subsequently removed from the fabric to a substantial extent by dry cleaning. The reason for this is not fully understood but it is not believed that the non-polymerizable polysiloxane is chemically bound to the methyl hydrogen polysiloxane resin but rather that it is only held by virture of surface attraction or some such effect.

To assist in the formulation of a stable emulsion, the silicone material is preferably dissolved in an organic solvent before being emulsified and almost any organic liquid that is a solvent for the silicone material can be employed for this purpose although a mixture of solvents is generally advantageous. The aromatic hydrocarbon solvents, as illustrated by benzene and toluene, are excellent solvents for silicone materials employed according to this invention but such solvents having a low specific gravity and an emulsion made therewith tends to separate due to the oil phase having a lower specific gravity than the aqueous phase. There exists, however, certain high density halogenated hydrocarbon solvents for silicones, as illustrated by carbon tetrachloride, chloroform, and chlorobenzene, which are fully miscible with the aromatic hydrocarbon solvents and it has been found that by utilizing a mixture of aromatic hydrocarbon and halogenated hydrocarbon solvents a suitable solvent mixture having a specific gravity of approximately unity can be prepared. Such a mixture of solvents results in a very stable emulsion and permits the preparation of a highly concentrated solution of the silicone material. The preferred solvent is a mixture of toluene and tetrachloroethylene. Other solvents which can be employed, either alone or in admixture with solvents such as mentioned above, include methyl ethyl ketone and butyl acetate or other solvents of these types. The purpose of the solvent is only to assist in the formulation of the emulsion and an emulsion can, if desired, be formed without the use of any solvent whatsoever, but such a procedure is not usually advantageous since it necessitates the use of a colloidal mill or the like to achieve a proper particle size in the emulsion.

The organic solution of the silicone material employed in forming the ammonical aqueous emulsion is most conveniently substantially as concentrated as the solubility of the silicone material will permit and preferably a solvent is selected which will permit a silicone concentration of about 25 to 60% by weight. This does not mean, however, that a satisfactory emulsion cannot radily be prepared with a more dilute solution of the silicone material and a 15% or less solution of the silicone material can readily be employed although this necessitates the use of large quantities of organic liquids and is, therefore, inconvenient and uneconomical.

The amount of ammonia to be employed in preparing the ammonical emulsion of the silicone material may also be varied within reasonably wide limits although at least enough ammonia should be employed to neutralize the organic acid employed as an emulsifying agent and best results are generally obtained when enough ammonia is employed to raise the pH of the emulsion to at least about pH 8 to pH 9. This generally requires at least 5% of 28% ammonia, based upon the weight of the organic solution of the silicone material. There is no operative upper limit as to the amount of ammonia that can be employed except that sufficient ammonia should not be employed to result in the pH of the bath to which the emulsion is added being raised above about pH 8 because a highly alkaline bath is undesirable for the reason previously explained. Normally, however, there is no reason for employing large excesses of ammonia and it is seldom if ever advantageous to employ an amount of 28% aqueous ammonia equal to more than about 20% of the weight of the organic solution of silicone material.

A suitable procedure for preparing the aqueous ammonical emulsion comprises placing a selected amount of water in a vessel provided with means to furnish vigorous agitation and then adding the desired quantity of ammonia. In a separate vessel, the silicone resin, solvent, and organic acid are mixed together to give a homogeneous solution and the organic solution is then slowly added, with agitation, to the dilute ammonia mixture. This constitutes a preferred procedure for making the aqueous ammonium emulsion but alternatively one can employ a colloidal mill or utilize any other known procedure for preparing emulsions. Provided a small enough particle size is obtained and sufficient emulsifying agent is employed, the emulsion is quite stable and one can prepare at one time a sufficient amount to last for a considerable period.

Following the preparation of the ammonical emulsion, a selected quantity thereof is slowly added to a bath in which the zirconium containing fabric is partially or totally immersed and it is an advantage of the invention that the same bath can be employed as was used to exhaust the zirconium compound onto the fabric. This is only true, however, if the bath is substantially free of zirconium compounds because any appreciable amount of dissolved zirconium compounds in the bath at the time the silicone emulsion is added results in the emulsion being broken and a precipitate of zirconium fatty acid salts. The rate at which the silicone emulsion can be added to the bath depends upon the starting pH of the bath and the higher the pH of the bath, the more rapidly the silicone emulsion can be satisfactorily added. If the pH of the bath is in the vicinity of 5 or 6, the silicone emulsion should be added over a minimum period of about 15 minutes to eliminate the possibility of localized areas of high concentration in the bath and to insure uniform exhaustion of the silicon material onto the fabric. If the initial pH of the bath is 7 or above, the silicone emulsion can be added all at once if desired since in a basic bath the rate of exhaustion is sufficiently slow that there is little danger of uneven application. The emulsion preferably should not be added to a bath having a pH below about 5 and if the bath does have an initial pH below this value, it can advantageously, before the emulsion is added, be made more basic by the addition of ammonia or some other basic material.

An amount of the silicone emulsion should be employed which results in there being deposited on the fabric an amount of silicone resin equal to at least about 0.1% of the weight of the dry fabric and preferably equal to at least about 0.3% of the weight of the dry fabric. If the resin is deposited in amounts less than about 0.1%, the degree of water repellency imparted to the fabric is not as great as is ordinarily desired and for the highest degree of water repellency and the greatest permanency, about 0.3% or more silicone resin should be deposited on the fabric. On the other hand, there is usually little advantage in applying the resin in amounts greater than about 1% of the dry weight of the fabric and as the amount of resin deposited on the fabric reaches 2% to 4% by weight, the fabric develops an undesirable hand. Of course, the application of such large quantities is also disadvantageous from an economic point of view.

It generally requires approximately 15 to 20 minutes for the silicone resin to exhaust onto the fabric if the final pH of the bath is between 5 and 6 and longer or shorter periods of time if the pH of the bath is above 6 or below 5 respectively. Normally not more than about 30 to 45 minutes need be allowed for exhaustion because even at pH 8 the emulsion will usually largely exhaust in this length of time but if the rate of exhaustion is inconveniently slow, it can be increased by lowering the pH of the bath, for example with acetic acid. Care should be exercised, however, not to lower the pH of the bath excessively because if the rate of exhaustion is exceedingly rapid, an uneven application is inevitably obtained, and normally the rate of exhaustion should be such that at least 10 to 15 minutes is required for the silicone to exhaust onto the fabric. When the silicone material in the bath has been largely transferred to the fabric, substantially complete exhaustion can be insured by the addition of an acid in an amount to result in the pH of the bath being lowered to about 6 or less if the terminal pH of the bath is higher than pH 6. It is also usually advantageous to add, preferably with the bath in an acidic condition, a relatively small quantity of the aqueous solution of zirconium compound employed in the first step of the process. A quantity of the zirconium solution equal to about 10% to 40% of that originally employed is generally satisfactory and not only is added insurance of substantially complete exhaustion of the silicone material from the bath but frequently results in the processed fabric having a higher degree of water repellency than would otherwise be obtained.

Following the application of the silicone material, the fabric is removed from the bath and dried in any suitable manner. Normally the fabric will be dried by means of conventional apparatus in which it is heated to from 90 to 100° C., but if desired the fabric can be dried at room temperature since it has been found that drying at elevated temperatures is not required to effect a satisfactory cure of the silicone resin.

The invention will now be illustrated by the following specific examples in which parts are by weight unless otherwise indicated:

EXAMPLE I

Preparation of Catalyst Solution

In a suitable reaction vessel there is placed 80 parts of water to which there is then added 20 parts of zirconium oxychloride. The mixture is stirred until solution is complete and a clear, water white solution is obtained. The solution is then stored until needed.

Preparation of Silicone Emulsion

In a first suitable stainless steel reaction vessel there is placed 88 parts of tetrachloroethylene to which there is added 52 parts of Armour Neofat 14 (myristic acid) and 18 parts of Armour Neofat 16 (palmitic acid). The mixture is then warmed and stirred until the fatty acid material is dissolved.

In a second stainless steel vessel there is placed 390 parts of toluene and 453 parts of Dow Corning 1107 silicone resin (a methyl hydrogen polysiloxane), and the mixture is stirred until homogeneous. There is then added 158 parts of the above fatty acid solution and the resulting mixture is stirred thirty minutes.

In a third stainless steel reaction vessel there is placed 98 parts of water and to this there is added 0.2 part of 28% ammonium hydroxide. There is then added, with vigorous agitation, 2 parts of the above silicone resin solution and agitation is continued for thirty minutes or until the silicone resin is well emulsified.

Application of Silicone and Catalyst Material to Fabric

A dark blue all wool flannel fabric dyed with acid leveling colors is loaded into a dye beck and a fresh water bath is drawn such that the beck contains about 3 gallons of water for each pound of fabric. With the fabric running through the bath in a conventional manner, the bath is allowed to reach equilibrium pH (the equilibrium pH should be about 3.0 if the fabric has been subjected to a conventional carbonizing operation) and there is then added over a period from of about 1 to 5 minutes, 12 ounces of the above catalyst solution for each 100 pounds of fabric. The fabric is allowed to run through the bath for about 15 minutes and there is then added 3 pounds, per 100 pounds of fabric, of sodium acetate which results in the bath having an equilibrium pH of about 5.0. The beck is then allowed to run an additional 10 minutes at the end of which time the bath, based on standard tests, is free of zirconium.

To the same bath used for application of the catalyst compound there is added over a period of about 15 minutes, with the beck running, 50 pounds, per 100 pounds of fabric, of the above described silicone emulsion. After an additional 10 minutes, there is added 4 ounces, per 100 pounds of fabric, of the above catalyst solution. The beck is then allowed to run for an additional five minutes and the fabric is removed, squeezed, and dried at 100° C. for 15 minutes. The fabric is found to be water repellent with a spray rating of 100+ and the water repellency has a high degree of permanency to washing and dry cleaning. Comparison of the fabric with an untreated sample indicates no observable shade change.

EXAMPLE II

Preparation of Catalyst Solution

In a suitable reaction vessel there is placed 90 parts of water and the water is heated to approximately 90° C. There is then added 10 parts of zirconium sulfate and the mixture is stirred until solution is complete. The solution is then cooled and stored until needed.

Preparation of Silicone Emulsion

In a suitable vessel there is placed 210 parts of carbon tetrachloride to which there is then added 100 parts of oleic acid. The mixture is then warmed and stirred until solution is complete.

In another vessel there is placed 746 parts of benzene and 450 parts of Carbide and Carbon silicone resin Y1002 (a methyl hydrogen polysiloxane) and the mixture is stirred until homogeneous. There is then added 310 parts of the above fatty acid solution and the resulting mixture is stirred one hour.

In still another reaction vessel there is placed 94 parts of water and to this there is added 0.5 part of 28% ammonium hydroxide. There is then added, with vigorous agitation, 6 parts of the above silicone resin solution and agitation is continued for one hour or until the silicone resin is well emulsified.

Application of Silicone and Catalyst Material to Fabric

A medium brown fabric containing 45% wool and 55% polyethyleneterephthalate fibers, the wool fibers being dyed with acid leveling colors, is loaded into a dye beck and a fresh water bath is drawn such that the beck contains about 5 gallons of water for each pound of fabric. With the fabric running through the bath in a conventional manner, the pH of the bath is adjusted to pH 3 with acetic acid and after 5 minutes there is added, as rapidly as desired, 4 pounds of the above catalyst solution for each 100 pounds of fabric. The fabric is allowed to run through the bath for about 15 minutes and there is then added 4 pounds, per 100 pounds of fabric, of sodium acetate. After 10 minutes, the pH of the bath is brought to about pH 7 with dilute ammonium hydroxide and the beck is allowed to run an additional 5 minutes. At this time the bath, for all practical purposes, is free of zirconium.

To the same bath used for application of the catalyst compound, there is added, over a period of about 30 seconds or at any desired rate, 45 pounds, per 100 pounds of fabric, of the above described silicone emulsion, and the beck is allowed to run for 30 minutes. The pH of the bath is then reduced to about 6 with acetic acid and there is added one pound, per 100 pounds of fabric, of the above catalyst solution. The beck is allowed to run an additional five minutes and the fabric is then squeezed and air dried without heat. The fabric has a spray rating of 100 and the water repellency is highly resistant to dry cleaning and washing. Comparison of the fabric with an untreated sample indicates no observable shade change.

EXAMPLE III

Example I is repeated except that there is employed in formulating the silicone emulsion a mixture of 403 parts of Dow Corning 1107 silicone resin and 50 parts of Dow Corning dimethyl silicone fluid. The results are substantially the same as in Example I.

The procedure when employing other zirconium compounds, silicone resins, organic acids, and solvents is the same as illustrated in the above examples.

Having thus described my invention and three specific embodiments thereof, what I desire to claim and secure by Letters Patent is:

1. A method for imparting water repellency to a wool containing fabric which comprises wetting said fabric in a water bath with a pH of from about pH 2 to pH 5, adding to said bath, while said fabric is being moved therein, a solution of a water soluble inorganic zirconium salt, retaining said fabric in motion in said bath until said zirconium salt is largely exhausted from said bath onto said fabric, adjusting the pH of said bath such that it is above about pH 5 but below pH 8, adding to said bath an ammoniacal aqueous emulsion of a fatty acid and a lower alkyl hydrogen polysiloxane resin, retaining said fabric in motion in said bath until said silicone resin is at least largely exhausted from said bath onto said fabric, and thereafter drying said fabric.

2. A method according to claim 1 wherein said zirconium salt is selected from groups consisting of zirconium chloride, zirconium oxychloride, zirconium sulphate, and mixtures thereof.

3. A method according to claim 1 wherein the pH of said bath, after said silicone resin is at least largely exhausted from said bath, is lowered to below about pH 6 there is then added an additional quantity of said water soluble zirconium salt.

4. A water repellent fabric prepared according to the method of claim 1.

5. A method for imparting water repellency to a wool containing fabric which comprises wetting said fabric in a water bath having a pH of below about pH 7, adding to said bath, as an aqueous solution, an amount of a water soluble inorganic zirconium salt equal to from about 0.2 to 0.5% of the weight of said fabric, retaining said fabric in motion in said bath for at least 10 to 30 minutes, adjusting the pH of said bath such that it is above pH 5 but below pH 8, adding to said bath an aqueous emulsion containing from about 0.3% to 1%, based upon fabric weight, of a lower alkyl hydrogen polysiloxane resin, a solvent for said resin, from 10% to 30%, based upon the weight of silicone resin, of a fatty acid having from about 12 to 18 carbon atoms, and an amount of ammonia at least stoichiometrically equivalent to said fatty acid, retaining said fabric in motion in said bath for at least about 10 to 30 minutes, and thereafter adding, as an aqueous solution, a quantity of said zirconium salt equal to from about 10 to 40% of the amount initially added.

6. A method according to claim 5 wherein the pH of said fabric, when said zirconium salt is largely exhausted onto said fabric, is adjusted by the addition of sodium acetate.

7. A method according to claim 5 wherein the pH of said bath is adjusted to a pH of below about 6 following the exhaustion of most of said silicone resin onto said fabric and before the second addition of said zirconium salt.

8. A method according to claim 5 wherein said ammonical emulsion also contains a quantity of a dimethyl silicone fluid.

9. A method according to claim 5 wherein said silicone resin is a methyl hydrogen polysiloxane, said fatty acid is a mixture of palmitic and myristic acids, and said zirconium salt is zirconium oxychloride.

References Cited in the file of this patent

UNITED STATES PATENTS

| | | |
|---|---|---|
| 2,698,334 | Rust et al. | Dec. 28, 1954 |
| 2,750,305 | Gagarine et al. | June 12, 1956 |
| 2,789,956 | Eder | Apr. 23, 1957 |
| 2,930,106 | Wrotnowski | Mar. 29, 1960 |